United States Patent Office 3,100,139
Patented Aug. 6, 1963

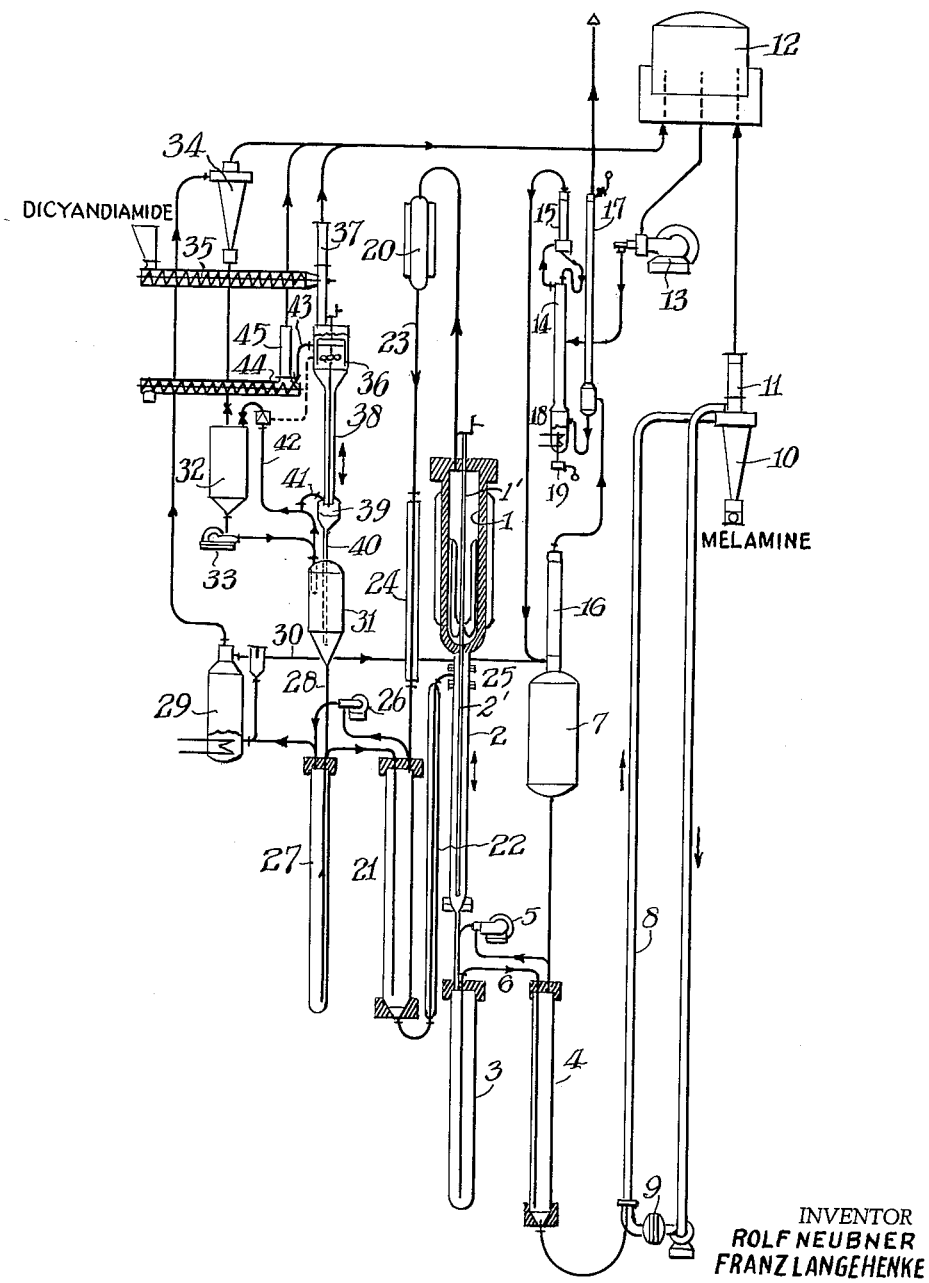

3,100,139
APPARATUS FOR THE PRODUCTION
OF MELAMINE
Rolf Neubner, Berlin-Zehlendorf, and Franz Langehenke, Dortmund, Germany; said Langehenke assignor to said Neubner
Original application Jan. 16, 1957, Ser. No. 634,454, now Patent No. 2,913,461, dated Nov. 17, 1959. Divided and this application Mar. 17, 1959, Ser. No. 804,058
Claims priority, application Germany Dec. 15, 1956
8 Claims. (Cl. 23—260)

The present invention relates to a process of producing melamine as well as to a combined device for carrying out the process. This application is a divisional application of Serial No. 634,454, filed January 16, 1957, now patent No. 2,913,461.

It is known to produce melamine by heating dicyandiamide in liquid ammonia under pressure. All known processes, however, possess considerable disadvantage. Either they work discontinuously or incomplete transformation of the raw materials which are applied to the reaction vessel takes place there. Certain other processes create conditions favouring undesirable subsidiary reactions which form higher molecular insoluble condensation products such as melam, melem, mellone etc. If the transformation is effected in the gaseous phase, also as hitherto, temperatures and pressures of such a degree become necessary that the required expenditure of energy makes the process considerably more expensive and the question of materials plays a by no means insignificant part involving further disadvantages and increase in cost.

All these disadvantages such as discontinuous operation, incomplete transformation, disproportionately high energy expense, cost increase due to special materials for the equipment, and so on, are eliminated in the process according to the present invention. Apparatus has furthermore been designed in which the process according to the invention may be carried out in an especially advantageous manner.

The process according to the invention consists essentially in the fact that the transformation of dicyandiamide into melamine takes place in a solution of dicyandiamide in pure liquid ammonia, the concentration of the solution lying between about 44 and about 97 percent by weight dicyandiamide, this percentage being calculated on the sum total of dicyandiamide plus ammonia; furthermore, the transformation takes place at temperatures above the critical temperature of the pure ammonia and below the melting point of the pure dicyandiamide in a reaction vessel under a pressure dependent, at any given instant, on the concentration of the dicyandiamide-ammonia solution and on the reaction temperature, which pressure may be situated between 41 atmospheres and the critical pressure of pure ammonia.

One of the particular characteristics of the present invention lies in the fact that the charging of the reaction vessel with the dicyandiamide-ammonia solution and the discharging from the reaction vessel of the melamine produced, and of the excess ammonia by its evaporation, takes place in a continuous manner, during which process the solid melamine precipitated in the transformation is led, on leaving the reaction vessel, in countercurrent to the pure liquid ammonia, for the purpose of a likewise continuous separation by washing out from the hot solution which still contains untransformed dicyandiamide, and of simultaneous cooling by heat exchange. In this manner, according to the invention, a complete (i.e. 100%) transformation into melamine of the dicyandiamide introduced in the reaction vessel is ultimately achieved in this vessel even in such a continuous operation.

It is advantageous to employ saturated dicyandiamide solutions in pure liquid ammonia for the charging of the reaction vessel, in such a way that at an arbitrarily regulated reaction temperature the highest possible dicyandiamide concentration in the dicyandiamide-ammonia solution prevails under the lowest possible reaction pressure which, on keeping the reaction temperature constant, will be constant. In this way also the best possible space/time yield of the process is obtained. As a lower concentration limit, therefore, a weight percentage of about 44 parts dicyandiamide, and accordingly 56 parts ammonia, i.e. a dicyandiamide-ammonia solution saturated at normal pressure, is permissible. As, however, with this concentration, a thermally neutral development of the process is no longer possible, no concentration will generally be chosen which lies below about 55 parts dicyandiamide, and accordingly about 45 parts of ammonia, percent by weight.

The upper concentration limit of the reacting solution in which the ammonia content does not amount to more than a few parts percent by weight is situated around 97 parts of dicyandiamide, and accordingly about 3 parts of ammonia.

The reaction temperature employed according to the invention lies between about 133° C. and about 205° C., advantageously between 165° and 190° C., whilst the reaction pressures lie between about 41 atmospheres and about 112 atmospheres advantageously between about 41 atmospheres and about 70 atmospheres. The pressure of about 41 atmospheres was measured at the highest dicyandiamide concentration, a little above the critical temperature of the pure ammonia.

In particular, the process according to the invention involves evaporation in the reaction vessel of the excess of the ammonia introduced in this vessel and subsequent reliquefaction still under the same pressure which exists in the reaction vessel at a temperature regulated at any given instant in such a way that the gas pressure in the reaction vessel remains constant.

According to a further feature of the invention, the ammonia evaporated and re-liquefied in the reaction vessel is used, after manometric storage, for automatically maintaining constant the dissolved matter content of the solution in the reaction vessel, being cooled down to a temperature of about 25° C. to about 30° C. and then employed for charging the reaction vessel together with the initial dicyandiamide-ammonia solution by admixing the latter by means of volumetric displacement under the pressure existing in the reaction vessel and with simultaneous pre-heating of this initial solution.

The further procedure according to the invention is to use the reaction heat freed during the formation of melamine for the evaporation of excess ammonia in the reaction vessel, for heating the pre-heated initial dicyandiamide-ammonia solution and for heating to reaction temperature the pure liquid ammonia which is displaced by the settling melamine and flows in countercurrent to the melamine, being at the same time pre-heated, the initial solution being regulated by such heating to a temperature at which the transformation of dicyandiamide into melamine in the reaction vessel proceeds with thermal neutrality when taking into account the abovementioned consumption of heat. Such pre-heating under reaction pressure of the initial dicyandiamide solution is usefully brought about in such a way as to cause at the same time also the dissolution of still solid dicyandiamide in the initial solution. Besides, in pre-heating such initial dicyandiamide-ammonia solution, evaporation is avoided by maintaining the dicyandiamide content in the initial solution at such level that the ammonia vapour pressure of the initial solution, at the pre-heating temperature needed for the aforesaid thermally neutral transformation, is lower than reaction pressure.

Similarly to the aforesaid introduction, it is proposed according to the invention to let the discharge of the crystal mash obtained after the transformation and during the countercurrent washing-out process and consisting of solid melamine and pure liquid ammonia, take place without interruption of the melamine separation, by means of volumetric displacement by liquid ammonia.

The melamine at first present as a crystal mash in pure liquid ammonia subsequent to the transformation, is now separated from such ammonia during further development of the process according to the invention by heating the crystal mash under ordinary pressure and suspended in a circulated stream of heated gaseous ammonia, the liquid ammonia being evaporated and separated from the circulation as a gas while the dry melamine is in turn separated from the gas stream and discharged under ordinary pressure. According to a further conception of the present invention, the dicyandiamide, previous to its employment for the production of the dicyandiamide-ammonia mash, is freed from adhering residual moisture and all impurities soluble in ammonia by cooling the introduced dicyandiamide under normal pressure by means of a dicyandiamide-ammonia solution saturated at about $-25°$ C. and by washing it with a pure saturated solution of this kind also under normal pressure. Then also the final dicyandiamide-ammonia solution for the production of melamine, obtained from the dicyandiamide-ammonia mash, will of course be equally free of residual moisture and all impurities. Such portions of the dicyandiamide solution in ammonia which overflow in the region where doses of dicyandiamide stock are added and which contain water and other impurities are now freed of ammonia and water by heating, after which the solid dicyandiamide obtained at first in an impure state is reintroduced to the process, together wth initial dicyandiamide, after purification by re-crystallization.

According to the invention, the apparatus for carrying out the described process consists essentially of a reactor having a tube suitably disposed at its bottom and provided with an agitator shaft, the tube serving as a suspension washer in which the separated melamine settles, and of a sediment container to which the melamine is conveyed and which at first is filled with pure liquid ammonia to be displaced by the melamine and which then proceeds to the aforesaid reactor by way of the suspension washer, flowing in countercurrent to the settling melamine. The apparatus further consists of a cooling arrangement connected to the reactor head by a duct, for the liquefaction of the ammonia evaporated in the reactor, of a manometric pipe for the storage of the liquefied ammonia, as well as of an adjoining cooling device which is connected to a receiving container or valve in which initially there is the dicyandiamide-ammonia stock solution, and of a heater and a mixing tube by way of which the dicyandiamide-ammonia stock solution, after volumetric displacement by the liquefied stored ammonia, proceeds from the valve to the reactor.

The apparatus also includes a melamine receiving container or valve which is subject, similarly to the sediment container, to the pressure existing in the reactor and which at first is filled with pure liquid ammonia; a circulation pump which takes liquid ammonia from the head of the melamine valve and drives it towards the crystal mash in the sediment container; and an immersion tube through which the crystal mash proceeds to the melamine valve when driven from the sediment container.

The is also provided a reservoir filled with pure liquid ammonia, as well as a suspension dryer into which the melamine crystal mash is pushed through the melamine valve by the ammonia from the aforesaid reservoir, and in which there is arranged a heater (calorifer) provided with a blower from which issues a circulating stream of heated ammonia gas. The melamine heat-dried in suspension is then separated in a cyclone from the ammonia gas stream; this cyclone has a valve for the discharge under ordinary pressure of the final melamine product.

Furthermore, for carrying out the process according to the invention, the apparatus includes a gasometer adapted to receive the ammonia obtained as a gas in the suspension dryer after it has passed a dust filter, as well as a compressor in series with the gasometer, for the re-liquefaction of the ammonia, and a fractionating column, a pre-cooling device, and the reservoir already mentioned which receives the circulated ammonia used for the displacement of the melamine crystal mash through the melamine valve, a main cooler and a compression washing device being incorporated with the reservoir, the bottom discharge of this washing device draining into the condensate container and flowing underneath said fractionating column.

The apparatus also comprises a screw conveyer for charging with stock dicyandiamide, a container with agitator into which dicyandiamide is first led, a suspension washing device in series with such agitator in which device the dicyandiamide-ammonia stock solution originating from the agitator container is washed in countercurrent to a pure saturated solution of the same kind under ordinary pressure, and also an overflow arrangement associated with the agitator, and a heated paddle screw to which the solution from such overflow containing water and other impurities is conveyed in equal doses, and a gasometer already mentioned to which inter alia the ammonia is applied, across a dust filter, which escapes from the screw in a gaseous condition.

Finally, the apparatus for the production of melamine includes also a dissolving vessel into which the dicyandiamide flows from the suspension washing device, and a reservoir into which the dicyandiamide-ammonia mash proceeds from the dissolving vessel by way of an immersion tube, and ducts through which the ammonia displaced thereby from the reservoir proceeds into the said dissolving vessel and into a storage tank for dicyandiamide-containing liquid ammonia, and also a preliminary dicyandiamide receiving container or valve into which the dicyandiamide mash is pushed through an immersion tube by means of liquid dicyandiamide-containing ammonia induced into the storage tank which ammonia proceeds into such storage tank from the reservoir with the aid of a pump; and a pressure tank into which the dicyandiamide-containing ammonia escapes, which is first contained in the preliminary valve. In series with the aforesaid heatable pressure tank there is arranged, according to the invention, a main condenser situated above the ammonia reservoir in which condensed ammonia evaporated in the pressure tank is re-liquefied to the extent required in the reservoir for displacing the melamine crystal mash from the melamine valve into the suspension dryer. Additionally the apparatus is equipped with a gas separator in which the residual dicyandiamide-containing ammonia from such pressure tank is expanded, and after its expansion and therefore cooling, escape into the pressure-less storage tank.

The apparatus for carrying out the process according to the invention includes such further essential parts as a dicyandiamide valve into which the dicyandiamide mash is pushed from the preliminary dicyandiamide valve after switching the latter's connection with the reservoir and the pressure tank over to the connection with the said dicyandiamide valve, and a circulation pump by which the liquid ammonia at first located in the dicyandiamide valve is compressed, in order to displace the dicyandiamide mash, into the preliminary dicyandiamide valve.

A particularly advantageous device for carrying out the process according to the invention consists of a combination of single devices and circulatory apparatus which combination is composed of a pressure-less equipment for floating, washing and dissolving dicyandiamide in liquid ammonia, a high-pressure system for the complete dissolution of the dicyandiamide still floating in the dicyandiamide-ammonia stock and initial solution and for the continuous transformation of the dicyandiamide dissolved in pure liquid ammonia into solid melamine, in conjunction with a device for the continuous supply and withdrawal of pure liquid ammonia and a device for the continuous withdrawal, cleaning and collecting of the produced melamine, and also a pressure-less device for separating and drying the solid melamine from liquid ammonia and ammonia gas, and an ammonia circulation system extending over all parts of the combined device, with heating, cooling, compressing and expanding as well as cleaning devices and circulation pumps.

The pressure-less input equipment for cleansing, floating and dissolving the dicyandiamide in liquid ammonia consists of a container with agitator mechanism, a suspension washing device, a dissolving vessel with immersion tube, a reservoir for the dicyandiamide mash as well as a storage tank for dicyandiamide-containing liquid ammonia and the necessary communication ducts as well as feeding and removal elements; the high-pressure system consists of two dicyandiamide valves, a heater and mixing tube, a reactor with suspension washing device and sediment container connected in series, a melamine valve and of cooling devices. The equipment for separating the solid melamine finally, consists of a suspension dryer with heater and cyclone, and the ammonia circulation system consists of a gasometer, a compressor for the liquefaction of ammonia and of circulation pumps for conveying ammonia and ammonia solutions as well as of a fractionating column, cooling devices, a compression washing device, the reservoir, a pressure tank, the gas separator and of communication ducts.

The valve devices, i.e. the melamine valve, the preliminary dicyandiamide valve, the dicyandiamide valve and the reservoir for the dicyandiamide mash may, according to a further conception of the present invention, be formed as twin containers whereby the operation of such valve devices may advantageously also take place in a continuous manner.

In particular, the following further points are explained:

Melamine results from dicyandiamide with favourable yield and a high purity when dicyandiamide is dissolved in liquid ammonia and the solution is heated under pressure. The transformation however takes place at sufficient speed only at temperatures above 133° C., this being the critical temperature of the pure liquid ammonia.

The critical temperature and the critical pressure of the pure liquid ammonia are altered by substances such as dicyandiamide when this is added to the liquid ammonia and dissolved therein, according to known formulae regarding increased boiling point and decrease of vapour pressure of such solutions, when compared with the corresponding pure solvent ammonia.

The high solubility of the dicyandiamide in liquid ammonia according to which for instance at minus 25° C. and under atmospheric pressure there may be dissolved, in 100 parts by weight of ammonia, as much as about 76.5 parts by weight of dicyandiamide, permits even the production of ammonia-dicyandiamide solutions of e.g. about 80 parts of dicyandiamide, and accordingly about 20 parts of ammonia, by weight percentage, which solutions are still in a liquid state at temperatures of over 186° C.

At the latter temperature, however, a rapid transformation into melamine takes place, the melamine produced precipitating from the saturated hot solution. The content of dissolved substances in the solution diminishes according to this precipitation of solid melamine. In order to maintain the liquid state at the high super-critical temperature, the precipitated melamine must however at all times be substituted by fresh dicyandiamide. Melamine is then continuously obtained in a saturated solution whose concentration must be the higher the greater the temperature of the reacting solution.

To obtain melamine from the solution at super-critical temperatures of the pure liquid ammonia, it is therefore essential to separate the solid melamine from the saturated solutions and to maintain constant, at the same time, a high dicyandiamide concentration. In the continuous mode of operation required for this, conditions are made additionally difficult by the need of having to remove melamine continuously from the reactor and to separate the melamine from the saturated solution while maintaining at the same time the constant high dicyandiamide concentration.

In the process according to the invention for continuous production of melamine from dicyandiamide-ammonia solutions in the super-critical temperature range of the pure liquid ammonia, the continuous discharge from the reactor of the melamine formed during the transformation and the continuous separation of such melamine from the saturated dicyandiamide ammonia solution is made possible, without at the same time having to withdraw such dicyandiamide-ammonia solution from the reactor and under a constant reaction pressure, and melamine washed with pure liquid ammonia is obtained without filtration. Further advantages result in the transformation itself when carried out according to the process of the present invention, and also during the making and the controlled furnishing according to the invention, of the initial solution which will be explained in more detail in the following.

According to the invention, the procedure in particular provides that the melamine crystallizing out in the reactor and quickly settling at the bottom sinks from there into a vertically arranged tube located at the bottom of such reactor, which tube merges into a container filled with pure liquid ammonia in which container the melamine will settle. Thereby the settling melamine displaces from such container into the reactor an amount of liquid ammonia corresponding to its own volume, the displaced ammonia which flows in counter-current to the melamine in the direction of the reactor, being capable of separating the dicyandiamide-containing solution from the melamine and completely cleaning the melamine. The liquid column in the vertical tube communicating between the reactor and the separator and sediment container arranged beneath it is kept gently rotating, e.g. by a vane-less shaft, in order to avoid laminar currents. The melamine is thereby completely separated, in a suspended state, from the upper dicyandiamide-containing solution and is moreover washed, in the lower part of the vertical tube with pure liquid ammonia. The vertical tube will in the following be termed the suspension washing device.

It has also been found that the suspension washing device may at the same time serve as heat exchanger for a complete heat exchange between the settling melamine and the upward-flowing pure liquid ammonia, the melamine thereby proceeding in a cooled state to the separating and settling container, after having imparted its effective heat to the ammonia which flows in the opposite direction.

In the accompanying drawing a device for carrying out the process according to the invention is shown diagrammatically and partly in section. This device, according to the invention, firstly consists of a reactor 1 having agitating means 1' with the suspension washing device 2, which has an axial stirring shaft 2' connected in series with it, and the settling container 3. The charge volume in reactor 1 including the suspension washing device 2 and the settling container 3 remains unaltered during melamine formation.

The discharge from the settling container 3 of the crystal mash consisting of melamine and pure liquid ammonia is also effected without volume alteration and without interruption of melamine separation by means of a melamine sluice or valve 4 which is at first also filled with pure liquid ammonia. The ammonia is withdrawn from valve 4 by means of a circulation pump 5 and is pressed on the crystal mash in the settling container 3 in such a way that the crystal mash is pushed through an immersion tube 6 toward the melamine valve 4 which is also still subject to the pressure existing in reactor 1, in the suspension washing device 2 and the settling container 3. The settling container 3 is then again charged with pure liquid ammonia while the crystal mash is now in the melamine valve 4.

This valve 4 containing the crystal mash is then separated, by means of locking members, from settling container 3 and is connected with a reservoir 7 for pure liquid ammonia in which there is ammonia at a temperature of about 30° C., at the corresponding boiling point pressure of about 12 atmospheres. The crystal mash in the melamine valve is now pushed, under the aforesaid pressure, into a suspension dryer 8 by means of the liquid ammonia from reservoir 7, in which dryer the crystal mash is freed, under ordinary pressure, from liquid ammonia by means of heated ammonia from the heater 9 which is provided with a blower. The dry melamine is quantitatively separated in a cyclone 10 and in a dust filter 11 while the ammonia evaporated in the suspension dryer 8 is led as an excess gas through a gasometer 12, a compressor 13, a fractionating column 14 for separating moisture possibly carried from the gasometer 12, and a preliminary cooler 15 arranged behind or above such fractionating column 14, into a main cooler 16 from which the ammonia by now re-liquefied returns by circulation to reservoir 7.

The residual gases accumulating in the main cooler 16 may be freed from ammonia in a compression washing device 17 by means of water and then released upwardly. The ammonia water thereby obtained is again freed from ammonia in the condenser receiver 18 underneath the aforesaid fractionating column 14 by means of heating, such ammonia proceeding into the fractionating column 14 while the water component is drawn off across a level-regulator 19 and thereby expanded.

The continued removal from reactor 1, of the melamine produced by means of the suspension washing device 2, causes the ammonia displaced by the settling melamine to proceed from the settling container 3 into reactor 1 in which, together with the ammonia introduced in the form of the dicyandiamide stock solution, it has to be evaporated in order to maintain a constant dicyandiamide concentration in this reactor. Such ammonia evaporated in reactor 1 is condensed under reaction pressure, i.e. under the pressure prevailing in reactor 1, in cooler 20 connected in series, the condensation temperature being a reactively determining factor for the reaction pressure in reactor 1. This condensation temperature of the ammonia which is to be liquefied is very different from the temperature of the dicyandiamide-ammonia solution in reactor 1, such difference depending on the dissolved-matter, i.e. dicyandiamide-content of such solution in reactor 1 at any given time. It has been found for instance that in reactor 1, at a temperature of 182° C., there results an ammonia gas pressure of about 64 atmospheres with a condensation temperature in cooler 20 of 101° C. This difference in temperature at a given time is a measure of the saturation of the solution in reactor 1. It remains constant only if the saturation of the dicyandiamide solution in reactor 1 is kept constant by the addition of fresh dicyandiamide-ammonia stock solution in accordance with the melamine formation proceeding in reactor 1.

The dosed addition into reactor 1 of dicyandiamide in the form of the dicyandiamide-ammonia stock solution is possible according to known practices, e.g. by power regulation of a suitable pump which takes the dicyandiamide-ammonia solution from a suitable pressure container. According to the invention, the dosed addition of the dicyandiamide-ammonia stock solution into reactor 1 may now take place with automatic regulation and without such dosing pump in that the ammonia re-liquefied while still under reaction pressure is used to push a dicyandiamide crystal mash from a dicyandiamide valve 21 through a heater or pre-heater 22 and a mixing tube 25 into reactor 1. Dicyandiamide crystal mash is here intended to mean a mash of excess dicyandiamide floated in a dicyandiamide-ammonia solution, the complete dissolution of the dicyandiamide taking place here only within heater 22, but prior to entry into reactor 1.

The ammonia liquefied in cooler 20 should be manometrically dammed in a pressure tube 23, previous to its use for the displacement of the dicyandiamide crystal mash from the dicyandiamide valve 21, to obtain the differential pressure required for such displacement, and should be cooled in a further cooler 24 from its condensation temperature down to about 26 to 30° C. in which process, by suitable regulation of the temperature of such cooled ammonia, it is possible to adjust its volume accurately to the volume of the displaced dicyandiamide crystal mash.

Self-regulation of dicyandiamide additions in the shape of the mash or of solution in liquid ammonia, which must correspond at any given time to melamine production in order to maintain a constant saturation of the solution in reactor 1, is effected by direct dependence, according to the invention, of the amount of ammonia liquefied in cooler 20 on the melamine formation itself if, as is the case here, operation is effected under constant gas pressure. During increased melamine formation and precipitation there takes place a correspondingly additional decrease of the dissolved matter content in the reacting solution which in turn results in an increased vapor pressure of the solution. In maintaining a constant gas pressure, there now takes place however an additional ammonia evaporation which is further increased by the fact that, owing to the increased melamine formation also the amount of the ammonia is increased which is displaced by melamine from the separator and settling container 3 and flows into reactor 1.

A change in melamine formation under constant gas pressure depends on the saturation and temperature of the dicyandiamide-ammonia stock solution at which such stock solution is fed into reactor 1 if no use is to be made of the reactor walls for the passage of heat. In such thermally neutral operation of reactor 1, the reaction heat produced during melamine formation is just sufficient to cover the amount of heat needed to evaporate the ammonia in reactor 1 and to heat the pre-heated dicyandiamide stock solution and the ammonia displaced from settling container 3 by the melamine. The thermally neutral operation may also be achieved with different concentrations of the dicyandiamide stock solutions fed into reactor 1 by accordingly regulating the input temperature of such stock solution into reactor 1. This temperature will have to be kept the higher, the lower the dicyandiamide content of such dicyandiamide-ammonia stock solution.

The pre-heating of the dicyandiamide-ammonia stock solution takes place in heater 22 in which a complete dissolution of still solid parts takes place when solutions still containing such solid dicyandiamide are employed. In order to avoid gas formation in heater 22 due to possible ammonia evaporation, there is to be maintained a maximum pre-heating temperature at which the vapor pressure of the dicyandiamide-ammonia stock solution has reached the gas pressure in reactor 1. In stock solutions with a low dicyandiamide concentration, i.e. with about 30 parts by weight of dicyandiamide for 100 parts ammonia, such maximum pre-heating temperature is already reached before reaching the pre-heating temperature needed for a thermally neutral operation. Thermally neutral operation is therefore dependent on a minimum dicyandiamide concentration in the dicyandiamide-ammonia stock solution while a thermally neutral mode of operation is safely attainable, when highly concentrated stock solutions with about 70 to 240 parts by weight of dicyandiamide for 100 parts by weight of ammonia are employed, by the mere regulation of the pre-heating temperature, in which case fluctuations of dicyandiamide concentration in such stock solution may be compensated without danger of evaporation in heater 22. The advantages of a thermally neutral mode of operation in reactor 1 consist in the fact that the transformation can be carried out without thermal stress of the reactor wall and independently of the reactor size. In this way it is also possible to employ corrosion-proof non-metallic reactor walls. Besides, the employment of high-grade steels hitherto customary or of titanium is now superfluous if at the same time mechanical stress owing to precipitated solid substances is avoided in reactor 1 which is the case during the continuous discharge of such solid substances by means of a suspension washing device 2 according to the invention.

The production of concentrated dicyandiamide-ammonia stock solutions may be carried out in a continuous or discontinuous manner and is applicable for the process to the invention in both cases. It has been found that the dicyandiamide valve 21 may be charged, without interruption of the self-regulating dosed addition of the dicyandiamide mash as dicyandiamide-ammonia stock solution into reactor 1, with fresh dicyandiamide mash by pressing the liquid ammonia which was used for the displacement of the dicyandiamide mash through heater 22 towards reactor 1, from dicyandiamide valve 21 into a preliminary dicyandiamide valve 27 by means of a circulation pump 26 which preliminary valve is itself filled with fresh dicyandiamide mash. The dicyandiamide mash is displaced therefore from the preliminary dicyandiamide valve 27 towards the dicyandiamide valve 21 while the liquid ammonia is pumped by means of the circulation pump 26 from the dicyandiamide valve 21 towards the preliminary dicyandiamide valve 27. The preliminary dicyandiamide valve 27 is subsequently separated from the dicyandiamide valve 21 by closure members and connected in its upper part to a pressure container 29 in which is contained dicyandiamide-containing ammonia and which is connected by the communication duct 30 to the main cooler 16 subject to an ammonia pressure of about 7.5 to 12 atmospheres which main cooler is arranged in the ammonia circulation system above reservoir 7 for liquid ammonia. Immersion tube 28 in the preliminary dicyandiamide valve 27 is in its turn connected to storage container 31 for the dicyandiamide mash from which such mash is displaced, by means of dicyandiamide-containing ammonia, from the storage tank 32 under normal pressure with the aid of a pump 33 through immersion tube 28 towards the preliminary dicyandiamide valve 27 while the dicyandiamide-containing ammonia is displaced from such preliminary dicyandiamide valve 27 towards pressure container 29 by the freshly introduced mash. It was established that during the displacement of the dicyandiamide mash by liquid ammonia which takes place twice according to the process of the invention, from the mash storage container 31 towards the preliminary dicyandiamide valve 27 and from there towards the dicyandiamide valve 21, only insignificant mixing takes place at the contact surfaces of the dicyandiamide mash with the liquid ammonia which is why mechanical separation of the two media in the valves, e.g. by a freely movable plunger, is unnecessary. The reason why no appreciable mixing takes place is that the specific weight of liquid ammonia, e.g. at minus 27° C., is 0.60 while the specific weight of a dicyandiamide mash containing e.g. 48.2 parts of solid dicyandiamide, 22.5 parts of dissolved dicyandiamide and 29.3 parts of ammonia by weight percentage, at a temperature of minus 25° C., amounts to 1.06.

It was also established that the liquid ammonia when used several times for the displacement of the dicyandiamide mash subsequently contained about 5 to 15 parts by weight of dicyandiamide for 100 parts by weight of ammonia. While on the one hand there is no objection to employing such dicyandiamide-containing ammonia for producing the dicyandiamide mash, such dicyandiamide-containing ammonia may not, on the other hand, be used for the discharge of melamine by melamine displacement and has to be freed of dicyandiamide previous to its being used for such purpose. For this reason, an amount of ammonia is evaporated from dicyandiamide-containing ammonia in the heatable pressure container 29, under a pressure of about 7.5 to 12 atmospheres and condensed in the main cooler 16 above the ammonia reservoir 7 being by now dicyandiamide-free ammonia, equal to the amount withdrawn from such reservoir 7 for the displacement of melamine. The residual amount of liquid dicyandiamide-containing ammonia is removed from the pressure container 29 and expanded in a gas separator 34 whereby a further part of the ammonia evaporates which is being reliquefied above the gasometer 12 in a way already described while the dicyandiamide-containing ammonia, expansion-cooled to about minus 27° C., runs from the gas separator 34 towards the storage tank 32.

The production of the dicyandiamide mash under normal pressure from solid dicyandiamide and from dicyandiamide-containing ammonia with a boiling point of about minus 27° C. may take place in a standard container 36 with built-in stirring mechanism.

The ammonia hereby evaporated is fed to gasometer 12 for liquefaction. First there will result under normal pressure a saturated solution of dicyandiamide in ammonia which boils at minus 25° C. and which is changed into a dicyandiamide mash by further addition of solid dicyandiamide. It was found that this mode of operation may advantageously be combined with a quantitative dehydration and cleansing of the solid dicyandiamide the water introduced with such dicyandiamide, e.g. in the shape of an adhering residual moisture of 0.2 percent by weight being already removed before the solid dicyandiamide is changed into a mash.

The transformation of dicyandiamide into melamine takes place with the greatest yields and highest purity in the absence of water. Small amounts of water up to about 5 percent by weight do not impair such transformation appreciably if the operation takes place under high ammonia pressure. During the continuous transformation in a reactor however even the residual moisture carried by the dicyandiamide causes such an accumulation of water in the reactor that tolerable limits are surpassed within a short time as becomes evident from the following explanation:

During a mean period of e.g. 15 minutes in which dicyandiamide is present for the purpose of the transformation into melamine, and with a moisture content in the solid dicyandiamide of 0.2 percent by weight 0.2 kg. of water accumulate in the reactor within 15 minutes for 100 kg. of transformed dicyandiamide.

Within 24 hours therefore, no less than 4.8 kg. of water will be contained in the reactor for 100 kg. of dicyandiamide and an only just tolerable maximum limit will have been reached. The water will then however be extractable from the reactor only together with the hot and concentrated solution. But to withdraw the aqueous solution from the reactor and to prepare the hot saturated solution always involves losses which, owing to the separation of water according to the invention already in the preliminary mash, may be avoided.

In order to separate such water during the preparation of the preliminary mash, the solid dicyandiamide is fed in dosed additions into stirring container 36 by a screw conveyor 35. The said stirring container 36 is connected, together with the inlet from screw conveyor 35, and through a dust filter 37, with gasometer 12, through which possibly evaporated ammonia is re-liquefied. At the bottom of stirring container 36 there is arranged a suspension washing device 38 with an axial vaneless shaft which leads into a small dissolving vessel 39 from which the dicyandiamide proceeds, as dicyandiamide mash in liquid ammonia, through an immersion tube 40 into storage container 31 for such dicyandiamide mash in which container there is dicyandiamide-containing ammonia cooled by expansion to about minus 27° C. The dicyandiamide-containing ammonia so displaced is led partly by duct 41 to the dissolving vessel 39 and partly by duct 42 to the storage tank 32 for dicyandiamide-containing liquid ammonia, the line leading to storage tank 32 being throttled by means of an automatic regulation device in such a way that the liquid ammonia proceeds through dissolving vessel 39, and from there as a saturated dicyandiamide-ammonia solution through the suspension washing device 38, into the stirring container 36 up to the overflow arrangement 43, whereby it is dammed to that extent.

The non-pre-cooled dicyandiamide falls from the screw conveyer 35 into the dicyandiamide-ammonia solution in stirring container 36 which is saturated at minus 25° C., the dicyandiamide also being cooled to minus 25° C. by the evaporating ammonia, and proceeds, evenly distributed by a stirring vane in such stirring container 36, into the suspension washing device 38 in which it settles and is thereby completely separated by washing out in countercurrent from water and other impurities soluble in ammonia. The washed dicyandiamide finally proceeds into dissolving vessel 39 in which only an amount of dicyandiamide is dissolved by the ammonia supplied over duct 41 as will result in a solution saturated under normal pressure and at minus 25° C. with about 76.5 parts of dicyandiamide for 100 parts of ammonia by weight. This is equivalent to a dicyandiamide-ammonia solution containing about 43 parts of dicyandiamide and about 57 parts of ammonia percent by weight. The undissolved dicyandiamide proceeds, together with saturated dicyandiamide-ammonia solution, in the form of a so-called dicyandiamide mash through an immersion tube 40 into storage container 31. The composition, i.e. the proportion of undissolved dicyandiamide in the ammonia solution saturated with dicyandiamide, is automatic if the dosed addition of dicyandiamide is maintained constant. The dicyandiamide mash at 31 contains between about 18 and about 55 percent by weight of undissolved dicyandiamide.

If a dicyandiamide mash contains for instance 18 percent of undissolved dicyandiamide and therefore 82 percent of dicyandiamide-ammonia solution by weight which solution in turn consists as stated above, of 43 percent of dicyandiamide and accordingly 57 percent of ammonia by weight, there results a composition, when related to the total quantity of undissolved and dissolved dicyandiamide plus ammonia, of 18 parts of undissolved dicyandiamide, 35.3 parts of dissolved dicyandiamide and 46.7 parts of ammonia by weight percentage. After complete dissolution in the pre-heater or in heater 22 of the solid dicyandiamide still present in the mash, the dicyandiamide-ammonia solution which is now led into reactor 1 is composed of a total amount of dissolved dicyandiamide of 53.3 percent and accordingly 46.7 percent of ammonia by weight. A calculation carried out accordingly produces, with a dicyandiamide mash having for instance 55 percent of undissolved dicyandiamide and accordingly 45 percent of dicyandiamide-ammonia solution by weight, a composition which if related to the total quantity of undissolved and dissolved dicyandiamide plus ammonia, amounts to 55 percent of undissolved dicyandiamide, 19.4 percent of dissolved dicyandiamide and 25.6 percent of ammonia by weight. After complete dissolution in the pre-heater or heater 22 there results accordingly in this case a composition of the dicyandiamide-ammonia solution containing a total amount of dissolved dicyandiamide of 74.4 percent and accordingly 25.6 percent of ammonia by weight.

In relation to 100 parts by weight of ammonia therefore, the dicyandiamide-ammonia stock solution contains a total dicyandiamide amount of between about 100 and about 300 parts by weight, and particularly between about 114 and about 290 parts by weight.

The solution containing water and other impurities which forms in the stirring container 36 during cooling of the freshly introduced solid dicyandiamide is led in evenly dosed additions, with a water content of up to about 5 percent by weight, from the overflow arrangement 43 of stirring container 36 to a heated paddle screw conveyor 44 and is heated in the said paddle screw conveyor 44, such water being led, together with the ammonia, through dust filter 45 to gasometer 12 as a gas while the separated impure solid dicyandiamide may be reintroduced into screw conveyor 35, after purification by recrystallization. The preliminary cleaning of dicyandiamide with liquid ammonia according to the invention results in an even mode of operation during the transformation of the dicyandiamide in reactor 1, as well as in the even production of melamine of the highest purity whereby the additional expenses necessary for the described preliminary cleaning of the dicyandiamide are justified. The operation of the valve devices may, according to a further conception of the present invention, also take place in a continuous manner if the melamine valve 4, the preliminary dicyandiamide valve 27, optionally also the dicyandiamide valve 21 and the storage container 31 are constructed as double containers.

The following example serves to illustrate the invention but it is not intended to limit it thereto:

*Example*

From 100 kg. of dicyandiamide and 41.6 kg. of liquid ammonia a dicyandiamide mash is produced under normal pressure which contains 68.3 kg. of undissolved dicyandiamide in a solution saturated at minus 25° C. and containing 31.7 kg. of dissolved dicyandiamide in 41.6 kg. of ammonia. Before entering reactor 1, the still undissolved dicyandiamide part of the dicyandiamide mash is dissolved under a pressure of 64 at. in heater 22, preheated to a temperature of +115° C. and diluted in the mixing tube 25 with 37.8 kg. of liquid ammonia from the suspension washing device 2, in such a way that the dicyandiamide-ammonia solution when entering the reactor 1 contains 100 kg. of dicyandiamide and 79.4 kg. of ammonia. The transformation in reactor 1 takes place at a temperature of 182° C. under a gas pressure of 64 at. the freed reaction heat being just about consumed in evaporating the introduced ammonia and in heating the pre-heated dicyandiamide-ammonia stock solution to the aforesaid reaction temperature.

The evaporated ammonia is condensed under reaction pressure in cooler 20, 79.4 kg. of liquid ammonia being obtained at a temperature of 101° C. After further cooling of the liquefied ammonia to +28° C. in cooler 24 under operational pressure, the liquefied ammonia has a volume of 132.5 litres and displaces the dicyandiamide mash also under reaction pressure from the dicyandiamide valve 21, the aforesaid quantities being re-fed into reactor 1 across heater 22 and mixing tube 25.

During the transformation, 100 kg. of melamine are produced from 100 kg. of dicyandiamide and are continuously discharged from reactor 1, automatically washed in the suspension washing device 2, with 37.8 kg. of liquid ammonia flowing in opposite direction from the settling container, and cooled during such process, the volume of the liquid ammonia being 63.6 litres at +30° C. and coinciding with the volume of the cooled melamine which is also 63.6 litres.

The melamine crystal mesh separated in liquid ammonia at +30° C. is displaced at reaction pressure from sediment container 3 by pure liquid ammonia which is taken from the melamine valve 4, by means of circulation pump 5 towards such melamine valve 4 from which the melamine crystal mash is displaced, after closing the melamine valve 4 off from setting container 3 which is under reaction pressure, by liquid ammonia taken from reservoir 7 towards the suspension dryer 8 under a pressure of 12 at. and at a temperature of +30° C. in which dryer the crystal mash is now freed from the adhering pure liquid ammonia under normal pressure. To this end 100 kg. of melamine are distributed, together with a residual 22.5 kg. of liquid ammonia, in the suspension dryer 8 through a nozzle and dried in suspension in an ammonia gas stream heated in heater 9. The melamine is separated from the ammonia gas stream in cyclone 10 and in dust filter 11 connected in series and discharged from such cyclone 10 as pure dry melamine with a purity of 99.7% and a yield of over 99 parts by weight percent. The said yield is referred to the amount of dicyandiamide introduced into the process over the dicyandiamide valve 21. This quantity corresponds to the dicyandiamide originally supplied over screw conveyor 35 less the proportion of dicyandiamide which is again discharged as dirty salt over paddle screw conveyor 44 and whose amount depends on the given moisture content and the impurities in the dicyandiamide raw material.

The preparation of the ammonia obtained in a gaseous state during the drying operation is effected by uniting it first of all in gasometer 12 with gaseous ammonia obtained during production of the dicyandiamide mash in stirring container 36, during the cleansing operation of the dicyandiamide in the heated paddle screw conveyor 44 or in dust filter 45 and during expansion of liquid ammonia to normal pressure and cooling from +30° C. to approx. minus 30° C. in the gas separator 34, which gasometer 12 serves for the reception of the obtained ammonia gas. The total quantity of ammonia gas obtained here amounts to 48.7 kg. i.e. 62.5 Nm.³, which are thereafter compressed in compressor 13 to a pressure of 12 at. and obtained free from water as a pure gas in the subsequent fractionating column 14 to be fed, across a preliminary cooler 15, to the main ammonia cooler 16 from which ammonia proceeds in liquid state at +30° C. to a reservoir 7 and is now ready for further use in the melamine valves 3 and 4.

The preparation of the liquid ammonia subject to reaction pressure which after displacement of the dicyandiamide mash is present in the dicyandiamide valve 21 is effected by first using the liquid ammonia to displace, under reaction pressure and with the aid of circulation pump 26, the dicyandiamide mash from the preliminary dicyandiamide valve 27 towards the said dicyandiamide valve 21 whereupon the dicyandiamide-containing ammonia, after switching the preliminary dicyandiamide valve 27 from its connection with the dicyandiamide valve 21 over to the connections with pressure container 29 on the one hand and storage container 31 for the dicyandiamide mash on the other hand, is now led with the aid of pump 33 from storage tank 32 under a pressure of 12 at. to storage container 31 and the dicyandiamide mash is thereby displaced from the said storage container 31 across immersion tube 28 towards the preliminary dicyandiamide valve 27, the ammonia with a slight dicyandiamide content being displaced at the same time from the said preliminary valve 27 towards pressure container 29, or escaping in this direction, which container is also under a pressure of 12 at.

Thereafter there are 79.4 kg. of liquid ammonia in pressure container 29 containing only a little dicyandiamide at a temperature of +28° C. of which 67.8 kg. are expanded to normal pressure in which process 14 kg. of ammonia will evaporate and proceed to gasometer 12 while 53.8 kg. of liquid ammonia are obtained at a temperature of minus 30° C. Of this, 41.6 kg. are consumed for the production of the dicyandiamide mash in the circulation through storage tank 32, storage container 31, dissolving vessel 39, suspension washing device 38 and stirring container 36 and in reverse direction while the residual amount evaporates in cooling the solid dicyandiamide introduced by screw conveyor 35 and is also evaporated in the paddle screw conveyor 44 in preparing the aqueous dicyandiamide-ammonia solution which overflows in stirring container 36. The non-expanded excess ammonia left in pressure container 29 is evaporated under a pressure of 12 at. in the said pressure container 29 by heating and is recovered in main cooler 16 together with the gases from gasometer 12 compressed in compressor 13, as dicyandiamide-free liquid ammonia. The surplus gasified in pressure container 29 amounts to 11.6 kg. of ammonia which, together with 48.7 kg. of ammonia gases compressed in compressor 13 from gasometer 12, yields just the right amount required for the valve operation with regard to the melamine for its displacement from sediment container 3 with 37.8 kg., and for the melamine discharge from the melamine valve 4 into the suspension dryer 8 as a crystal mash with 22.5 kg. of ammonia.

The ammonia losses during the operation according to the invention amount to less than 1.5 kg. of ammonia, related to a yield of 100 kg. of melamine.

In comparison with hitherto disclosed transformations of dicyandiamide into melamine from dicyandiamide-ammonia solutions at temperatures beyond the critical temperature of the pure liquid ammonia, it is seen that, as a result of the automatic separation of the melamine from the hot saturated dicyandiamide-ammonia solution in the reactor on the one hand, and of the automatic washing out of the melamine in the suspension washing device with pure liquid ammonia with simultaneous cooling of the melamine on the other hand, it is possible to attain the following decisive advantages:

The dicyandiamide concentration in the reactor may be kept at a constant level by means of evaporation of ammonia without impairing the transformation.

The use of high dicyandiamide concentrations in the dicyandiamide-ammonia stock solution in the form of a dicyandiamide mash with approx. 75 parts of dicyandiamide and 25 parts of ammonia by weight percent has been made possible by the invention also for continuous transformation of the dicyandiamide whereby the transformation in the reactor may be kept thermally neutral.

By maintaining high dicyandiamide concentration constant in the reactor, high transformation temperatures are obtained with low gas pressure, at which temperatures the speed of transformation, and therefore the space/time yield, may be kept on an even level.

For the purpose of maintaining high dicyandiamide concentrations constant in the reactor, the ammonia evaporated in the reactor may be used after condensation, manometric storage and cooling for the self-regulating dosed addition of dicyandiamide mash, or dicyandiamide-ammonia stock solution, to the reactor.

We claim:

1. An apparatus for the production of melamine comprising, in combination, a vertically supported reactor, reactor feeding means for introducing dicyandiamide and ammonia into said reactor, a vertically supported suspension washing tube connected at the bottom of said vertically supported reactor, stirring means within said reactor and said suspension washing tube, a settling container for the melamine connected below said vertically supported suspension washing tube, a receiving container for receiving the melamine from said settling container through an immersion tube equipped with a shutoff and connecting said receiving container with said settling container, circulating pumping means also connected to said settling container and said melamine receiving container for withdrawing ammonia from said receiving container and relaying it to said settling container to force the melamine from said settling container through said immersion tube and into said receiving container, an ammonia pressure reservoir connected to said melamine receiving container by a feed line equipped with a shutoff, melamine product separation and drying means connected by a conduit with the bottom of said melamine receiving container for receiving the melamine therefrom when ammonia is fed to the receiving container from said ammonia reservoir with the shutoff closed in said immersion tube, an ammonia discharge tube connected to the top of said reactor, condensing means connected in series to said ammonia discharge tube, a manometric tube attached to said condensing means, a subsequent cooler connected to said manometric tube, a dicyandiamide mash receiving container connected to said subsequent cooler, a heated discharge conduit connecting the bottom of said dicyandiamide mash receiving container with said reactor by said reactor feeding means, and means for producing an ammonia-dicyandiamide mash feedably connected to said dicyandiamide receiving container, the resulting melamine product crystals descending through said suspension washing tube to said settling container whereupon ammonia is displaced from said washing tube and flows into the reactor where excess ammonia is evaporated overhead through said ammonia discharge tube into said ammonia condensing means, the resulting liquid being collected in said manometric tube and then passing through said subsequent cooler into said dicyandiamide mash receiving container to displace an equal volume of ammonia-dicyandiamide mash and feed the same through said discharge conduit and reactor feeding means to the reactor.

2. An apparatus according to claim 1 in which said melamine product separation and drying means comprise a receiving suspension dryer, a heater with a blower connected with said dryer for introducing hot ammonia gas thereinto, a cyclone connected with the dryer in which the dried melamine is separated from the ammonia gas, and a valve in said cyclone for discharging under ordinary pressure the melamine end product.

3. An apparatus for the production of melamine according to claim 2 in which the melamine product separation and drying means includes an ammonia reliquefaction and purifying means comprising a gasometer connected with said dryer by a conduit for receiving the ammonia obtained as a gas in the suspension dryer, a dust filter in said conduit, a discharge conduit connected with said gasometer, a compressor connected with said discharge for the reliquefaction of the ammonia, a fractionating column connected with said compressor for receiving the ammonia therefrom, a preliminary cooler connected with the fractionating column for receiving the ammonia therefrom, a main cooler which receives the ammonia from the preliminary cooler, said main cooler leading into the ammonia pressure reservoir, a compression washing device leading off of the main cooler for freeing the residual gases accumulating in said main cooler from the ammonia and releasing them upwardly, and a condenser receiver underneath said fractionating column, connected with the latter and said compression washing device.

4. An apparatus for the production of melamine according to claim 1 wherein the means for producing an ammonia dicyandiamide mash comprises a screw type conveyor feeder for conveying dicyandiamide, a stirring container which receives the dicyandiamide from the screw type conveyor feeder, a suspension washing device underneath the stirring container in which the dicyandiamide derived from the stirring container is washed in countercurrent with a pure saturated dicyandiamide ammonia solution under ordinary pressure, an overflow device for said stirring container, a heated paddle screw conveyor adjacent the overflow device into which the solution containing water and other impurities is led from the overflow device in measured quantities, a conduit leading to said gasometer into which the gaseous ammonia escaping from the paddle screw conveyor is led, and a dust filter in said conduit.

5. An apparatus for the production of melamine according to claim 4 in which said means for producing ammonia dicyandiamide mash comprises a dissolving vessel underneath the aforesaid suspension washing device into which the dicyandiamide ammonia stock flows from said suspension washing device, a storage container connected with said dissolving vessel into which the dicyandiamide mash proceeds from the dissolving vessel, a storage tank, ducts connecting said storage container with said dissolving vessel and said storage tank through which ducts dicyandiamide containing ammonia displaced from the storage container proceeds into the aforesaid dissolving vessel and into said storage tank for storing dicyandiamide-containing liquid ammonia, a preliminary dicyandiamide receiving container serving as a dicyandiamide supply container connected with said storage container from which the dicyandiamide mash is displaced into the preliminary dicyandiamide receiving container by dicyandiamide-containing liquid ammonia flowing from the storage tank into the storage container, and a pressure container connected with said preliminary dicyandiamide receiving container into which pressure container the discyandiamide-containing ammonia first contained in the preliminary dicyandiamide receiving container escapes.

6. An apparatus for the production of melamine according to claim 5 wherein the pressure container is connected with the main cooler above the ammonia pressure reservoir in which cooler ammonia evaporated in the pressure container is reliquefied and used in the ammonia pressure reservoir for displacing the melamine crystal mash from the melamine receiving container into the suspension dryer; and a gas separator connected with the pressure container into which separator the residual dicyandiamide-containing ammonia is removed from the pressure container and expanded, and a storage tank under noramal pressure connected with said gas separator which tank receives said dicyandiamide-containing ammonia from said gas separator.

7. An apparatus for the production of melamine according to claim 5 in which the preliminary dicyandiamide receiving container is connected to said dicyandiamide receiving container into which dicyandiamide and ammonia is displaced from said preliminary dicyandiamide receiving container, means for closing off the connection between the containers, and between the preliminary dicyandiamide container and said storage container, and a circulation pump connected to the preliminary dicyandiamide receiving container and dicyandiamide receiving container whereby liquid ammonia present in the dicyandiamide receiving container is forced into the preliminary dicyandiamide receiving container displacing the dicyandiamide mash from the preliminary dicyandiamide receiving container into said dicyandiamide receiving container.

8. An apparatus for the production of melamine according to claim 7 wherein the said preliminary dicyandiamide receiving container, the said dicyandiamide receiving container, and the said storage container for the dicyandiamide mash, in addition to a melamine receiving container are built as double containers, whereby all operations of these devices take place in a continuous manner.

References Cited in the file of this patent

UNITED STATES PATENTS

| | | |
|---|---|---|
| 2,373,869 | Wintringham | Apr. 17, 1945 |
| 2,375,731 | Caldwell et al. | May 8, 1945 |
| 2,387,406 | Ornstein | Oct. 23, 1945 |